(12) United States Patent
Konishi et al.

(10) Patent No.: US 9,850,963 B2
(45) Date of Patent: Dec. 26, 2017

(54) ELECTROMAGNETIC CLUTCH AND METHOD FOR MANUFACTURING SAME

(71) Applicant: DENSO CORPORATION, Kariya, Aichi-pref. (JP)

(72) Inventors: Toshihiro Konishi, Kariya (JP); Yoshinori Fukumura, Kariya (JP); Yasuo Tabuchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/113,851

(22) PCT Filed: Feb. 20, 2015

(86) PCT No.: PCT/JP2015/000808
§ 371 (c)(1),
(2) Date: Jul. 25, 2016

(87) PCT Pub. No.: WO2015/129218
PCT Pub. Date: Sep. 3, 2015

(65) Prior Publication Data
US 2017/0030420 A1    Feb. 2, 2017

(30) Foreign Application Priority Data

Feb. 28, 2014    (JP) ................................ 2014-038286

(51) Int. Cl.
*F16D 27/14*    (2006.01)
*F16D 27/10*    (2006.01)
(Continued)

(52) U.S. Cl.
CPC ............ *F16D 27/14* (2013.01); *F16D 27/112* (2013.01); *F16D 3/76* (2013.01); *F16D 13/76* (2013.01); *F16D 2027/005* (2013.01); *F16D 2121/20* (2013.01); *F16D 2250/00* (2013.01); *H01F 27/402* (2013.01)

(58) Field of Classification Search
None
See application file for complete search history.

(56) References Cited

U.S. PATENT DOCUMENTS

| | | | | |
|---|---|---|---|---|
| 5,687,823 A | * | 11/1997 | Nakagawa | ................ F16D 9/02 192/84.961 |
| 5,936,501 A | * | 8/1999 | Seino | .................... F16D 27/112 335/142 |
| 5,941,357 A | | 8/1999 | Tabuchi et al. | |

FOREIGN PATENT DOCUMENTS

JP    H10089385 A    4/1998

* cited by examiner

*Primary Examiner* — Mark A Manley
(74) *Attorney, Agent, or Firm* — Harness, Dickey & Pierce, P.L.C.

(57) ABSTRACT

A coil housing has an inner ring, which is shaped into an annular form and is placed on an inner side of an electromagnetic coil in a radial direction of a rotational axis. A thermal fuse is placed on an inner side of a coil inner peripheral end of the electromagnetic coil in the radial direction, so that the thermal fuse can be placed in such a manner that the thermal fuse does not limit a length of the electromagnetic coil in a direction of the rotational axis by using a radial thickness of the inner ring that is indispensable as a part of a structure of a magnetic circuit. Thus, it is possible to sufficiently limit occurrence of limiting of a size of the electromagnetic coil that is caused by the placement of the thermal fuse.

31 Claims, 6 Drawing Sheets

(51) Int. Cl.
  *F16D 27/112*   (2006.01)
  *F16D 3/76*     (2006.01)
  *F16D 13/76*    (2006.01)
  *H01F 27/40*    (2006.01)
  *F16D 27/00*        (2006.01)
  *F16D 121/20*       (2012.01)

ELECTROMAGNETIC CLUTCH AND METHOD FOR MANUFACTURING SAME

CROSS REFERENCE TO RELATED APPLICATIONS

This application is a U.S. National Phase Application under 35 U.S.C. 371 of International Application No. PCT/JP2015/000808 filed on Feb. 20, 2015 and published in Japanese as WO 2015/129218 A1 on Sep. 3, 2015. This application is based on and claims the benefit of priority from Japanese Patent Application No. 2014-038286 filed on Feb. 28, 2014. The entire disclosures of all of the above applications are incorporated herein by reference.

TECHNICAL FIELD

The present disclosure relates to an electromagnetic clutch, which couples and decouples transmission of a drive force through use of an electromagnetic attractive force, and a method for manufacturing such an electromagnetic clutch.

BACKGROUND ART

Various prior art documents disclose a technique related to an electromagnetic clutch. For example, the patent literature 1 is one of such prior art documents. The electromagnetic clutch of the patent literature 1 includes: a rotor that is rotated upon receiving a rotational force from a rotational drive source; a hub that is joined to a rotatable shaft of a compressor; a coil housing that receives and fixes a coil spool, around which an electromagnetic coil is wound; and an armature that is attracted to and attached to a friction surface of the rotor by an electromagnetic attractive force generated from the electromagnetic coil. A tilt surface is formed at an inner peripheral corner of the coil spool, which is located on the side where the friction surface of the rotor is placed. A thermal fuse is placed in a recess formed by the tilt surface. The thermal fuse is fused at or higher than a predetermined temperature to stop supply of an electric power to the electromagnetic coil.

However, in the electromagnetic clutch of the patent literature 1, due to the provision of the recess at the inner peripheral corner of the coil spool, a wire space, at which the electromagnetic coil is wound at the inner peripheral corner of the coil spool, is reduced in the axial direction of the electromagnetic clutch. Therefore, the size of the electromagnetic coil is reduced due to the provision of the thermal fuse. However, the inventors of the present application have found that there is a possibility of increasing the winding space in comparison to the electromagnetic clutch of the patent literature 1 through reconsideration of the arrangement of the thermal fuse. Specifically, the electromagnetic clutch of the patent literature 1 is not good enough in view of an objective of limiting a reduction of the winding space of the electromagnetic coil caused by the installation of the thermal fuse.

CITATION LIST

Patent Literature

PATENT LITERATURE 1: JP10-89385A (corresponding to U.S. Pat. No. 5,941,357A)

SUMMARY OF THE INVENTION

The present disclosure is made in view of the above points, and thereby it is an objective of the present disclosure to provide an electromagnetic clutch, which can sufficiently limit occurrence of liming a size of an electromagnetic coil caused by installation of a thermal fuse, and a manufacturing method of the electromagnetic clutch.

To achieve the above objective, according to the present disclosure, there is provided an electromagnetic clutch comprising:

a driving-side rotatable member that is made of a magnetic material and is rotated about a rotational axis upon receiving a rotational force from a rotational drive source;

a driven-side rotatable member that is rotated about the rotational axis upon receiving the rotational force from the driving-side rotatable member;

an electromagnetic coil that is shaped into an annular form, which is centered on the rotational axis, wherein the electromagnetic coil generates an electromagnetic attractive force upon energization of the electromagnetic coil;

a coil housing that is fixed to a non-rotatable member and is made of a magnetic material, wherein the electromagnetic coil is received in and is fixed to the coil housing;

an armature that is made of a magnetic material, wherein the armature is attracted to and attached to a friction surface of the driving-side rotatable member in an axial direction of the rotational axis by the electromagnetic attractive force generated from the electromagnetic coil;

an elastic connector that joins between the driven-side rotatable member and the armature and is placed to rotate integrally with the driven-side rotatable member and the armature, wherein the elastic connector holds the armature at a location, which is spaced from the friction surface of the driving-side rotatable member, when the electromagnetic coil is not energized; and a thermal fuse that is fixed to the coil housing and is placed to receive frictional heat, which is generated by friction between the armature and the friction surface of the driving-side rotatable member, wherein the thermal fuse is melted and is opened to cut supply of an electric power to the electromagnetic coil when a temperature is equal to or higher than a predetermined temperature, and wherein the thermal fuse is placed on an inner side of an innermost part of the electromagnetic coil in a radial direction of the rotational axis.

With the above construction, since the thermal fuse is placed on the inner side of the innermost part of the electromagnetic coil in the radial direction of the rotational axis, the thermal fuse can be placed without limiting the axial length of the electromagnetic coil. Thus, it is possible to sufficiently limit occurrence of liming the size of the electromagnetic coil caused by the installation of the thermal fuse.

DESCRIPTION OF EMBODIMENTS

Figure 1:
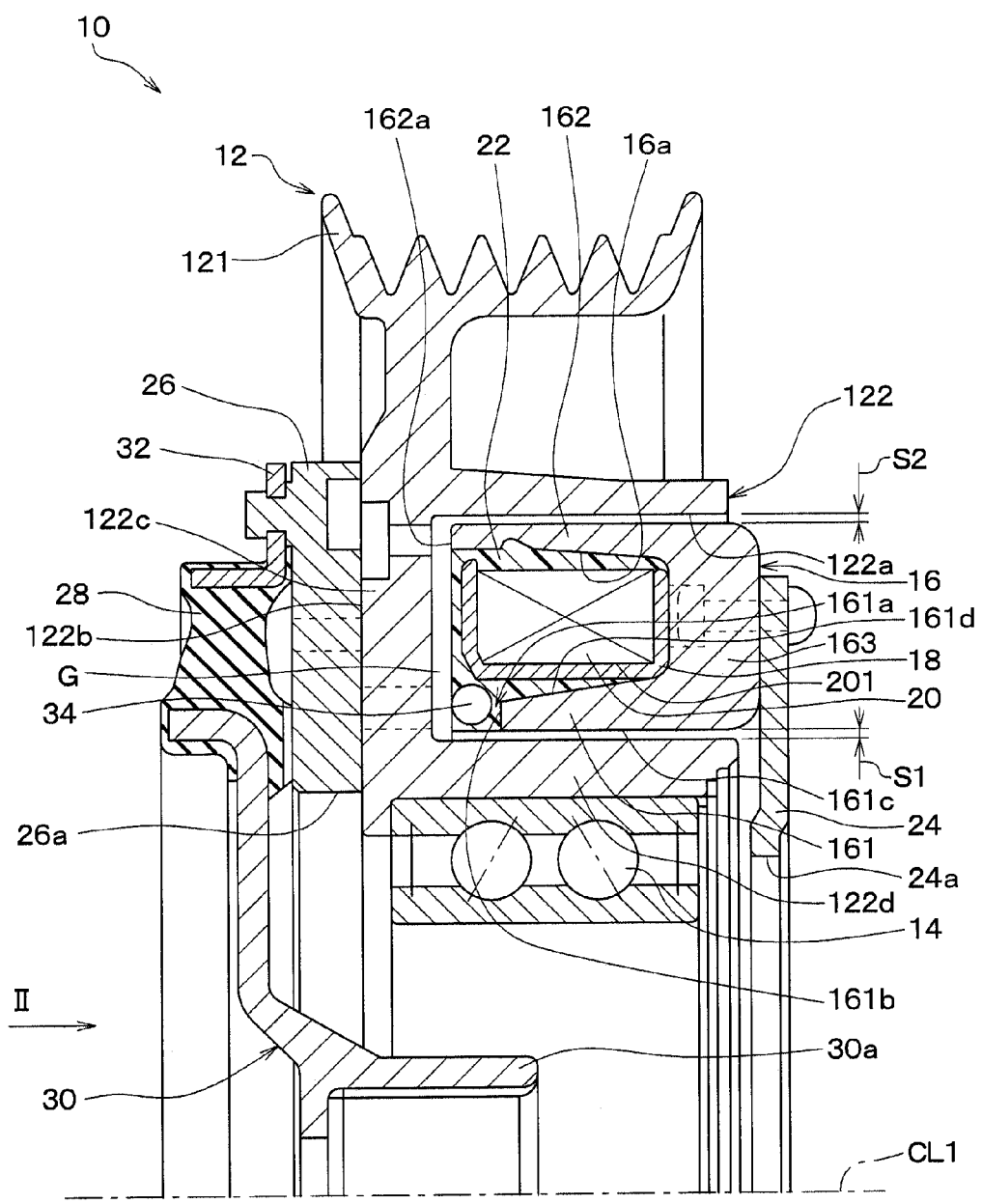
FIG. 1 is a longitudinal cross sectional view of an electromagnetic clutch according to a first embodiment of the present disclosure.

Hereinafter, embodiments of the present disclosure will be described with reference to the drawings. In each of the following embodiments, portions, which are identical to each other or are equivalent to each other, will be indicated by the same reference signs in the drawings.

First Embodiment

FIG. 1 is a longitudinal cross sectional view depicting an electromagnetic clutch 10 of the present embodiment. In FIG. 1, a lower portion of the electromagnetic clutch 10, which is located on a lower side of a central axis of the electromagnetic clutch 10, is omitted for the sake of simplicity. The electromagnetic clutch 10 is used for the purpose of compressing refrigerant in a refrigeration cycle of a vehicle air conditioning apparatus and serves as a drive force coupling and decoupling device that couples and decouples a drive force transmission path from an engine, which is a rotational drive source, to a compressor, which compresses the refrigerant. A dot-dash line CL1 of FIG. 1 is the central axis CL1 of the electromagnetic clutch 10, i.e., a rotational axis CL1 of the electromagnetic clutch 10. Furthermore, FIG. 1 indicates a clutch-on state of the electromagnetic clutch 10, in which the electromagnetic clutch 10 transmits the drive force.

As shown in FIG. 1, the electromagnetic clutch 10 includes a driving-side rotatable member 12, a bearing 14, a coil housing 16, a coil spool 18, an electromagnetic coil 20, a resin member 22, an arm support 24, an armature 26, an elastic member 28, an inner hub 30, a holding member 32 and a thermal fuse 34.

The driving-side rotatable member 12 is made of a magnetic material, such as iron metal. The driving-side rotatable member 12 is rotated about the clutch central axis CL1, which is the predetermined rotational axis CL1, when the driving-side rotatable member 12 receives the rotational force from the rotational drive source. The driving-side rotatable member 12 includes a driving-side pulley 121 and a driving-side rotor 122, which are arranged one after another from an outer side to an inner side in a radial direction of the driving-side rotatable member 12. The driving-side pulley 121 is rotated when the driving-side pulley 121 receives the rotational force from the vehicle engine through an undepicted belt, which is wound around an outer peripheral portion of the driving-side pulley 121.

An annular groove 122a is formed in the driving-side rotor 122 such that the annular groove 122a has a rectangular cross section that opens at one side thereof in a direction of the rotational axis CL1, i.e., the axial direction of the rotational axis CL1. The annular groove 122a is shaped into a ring form that circumferentially extends about the rotational axis CL1. Therefore, the driving-side rotor 122 is shaped into a double cylindrical tubular form that is formed by two cylindrical tubes, which are connected together in the radial direction. The driving-side rotor 122 is formed integrally with the driving-side pulley 121 as a one-piece component.

The bearing 14 is installed to an inner peripheral portion of the driving-side rotor 122. The driving-side rotor 122 has a bearing fitting portion 122d, which is shaped into a cylindrical tubular form and is fitted to an outer peripheral portion of the bearing 14. The driving-side rotor 122 is rotatably supported by a cylindrical tubular projection of a front housing of the compressor, which is not depicted in the drawings, through the bearing 14.

The coil housing 16 is made of a magnetic material, such as iron metal. The coil housing 16 functions as a stationary magnetic member that is fixed to the front housing, which is a non-rotatable member. The coil housing 16 is shaped into a double cylindrical tubular form, which is similar to the double cylindrical tubular form of the driving-side rotor 122. Furthermore, an annular groove 16a, which has a rectangular cross section, is also formed in the coil housing 16. However, an opening direction of the annular groove 16a is an opposite direction that is opposite from an opening direction of the annular groove 122a of the driving-side rotor 122 in the direction of the rotational axis CL1.

The rotational axis CL1 serves as a central axis of the coil housing 16. The coil housing 16 includes an inner ring 161, which is shaped into a cylindrical tubular form, an outer ring 162, which is shaped into a cylindrical tubular form, and a back surface portion 163, which joins between the inner ring 161 and the outer ring 162. The inner ring 161 is placed on an inner side of the outer ring 162 in the radial direction of the coil housing 16. The inner ring 161, the outer ring 162 and the back surface portion 163 form the annular groove 16a described above between the inner ring 161 and the outer ring 162. The annular groove 16a serves as a coil receiving portion of the coil housing 16, which receives the coil spool 18 and the electromagnetic coil 20.

The coil spool 18 is made of a dielectric material, such as resin, and is shaped into a circular ring form. The electromagnetic coil 20 is wound around the coil spool 18 and is securely held by the coil spool 18. The coil spool 18 and the electromagnetic coil 20 are received in the annular groove 16a of the coil housing 16 and are placed on the outer side of the inner ring 161 in the radial direction of the rotational axis CL1. The electromagnetic coil 20 and the coil spool 18 are shaped into a circular annular form that is centered on the rotational axis CL1. Furthermore, the inner ring 161 has an inner ring outer peripheral surface 161d that is formed at an outer side of the inner ring 161 in the radial direction of the rotational axis CL1. The inner ring outer peripheral surface 161d forms an inner peripheral surface of the annular groove 16a at an inner side of the annular groove 16a in the radial direction of the rotational axis CL1.

The annular groove 16a of the coil housing 16 and a cutout 161a, which will be described later, are configured such that the resin member 22 is filled into the annular groove 16*a* and the cutout 161*a*, and thereby the coil spool 18 and the electromagnetic coil 20 are fixed to the coil housing 16, and electrical insulation between the electromagnetic coil 20 and the coil housing 16 is ensured. The electromagnetic coil 20, which is placed in the above described manner, generates an electromagnetic attractive force (a magnetic attractive force) when the electromagnetic coil 20 is energized.

Furthermore, the thermal fuse 34 is fixed to the coil housing 16 by filling the resin member 22 into the annular groove 16*a* and the cutout 161*a*. The resin member 22 is interposed between the thermal fuse 34 and the coil housing 16, so that electrical insulation between the thermal fuse 34 and the coil housing 16 is ensured. In this way, the coil housing 16, the coil spool 18, the electromagnetic coil 20, the resin member 22 and the thermal fuse 34 are integrated together as a ring-shaped component. The bearing fitting portion 122*d* of the driving-side rotatable member 12 is placed on an inner side of this ring-shaped component in the radial direction of the rotational axis CL1. Specifically, the bearing fitting portion 122*d* serves as an inner peripheral portion that is located on the radially inner side of the coil housing 16 and the electromagnetic coil 20.

The resin member 22 is molded by filling a resin material (e.g., epoxy resin or unsaturated polyester), which is moldable at a relatively low temperature (e.g., 130 to 140 degrees Celsius), into the annular groove 16*a* of the coil housing 16. The resin member 22 is a dielectric member made of a dielectric material and is fixed to the coil housing 16 when the resin member 22 is solidified in the annular groove 16*a*.

A resin material of the coil spool 18 is desirably a resin material (e.g., nylon, polyphenylene sulfide, or polybutylene terephthalate), which is highly heat resistant against heat generated from the electromagnetic coil 20 and has a certain degree of rigidity. The heat distortion temperature of the above-described resin materials is a sufficiently high temperature (e.g., equal to or higher than 200 degrees Celsius), which is sufficiently higher than the molding temperature (e.g., 130 to 140 degrees Celsius) of the resin member 22. Therefore, a problem, which would be caused by the molding of the resin member 22, will not occur.

The coil housing 16 is placed in the inside of the annular groove 122*a* of the driving-side rotor 122 such that small gaps S1, S2 are formed between the coil housing 16 and the surface of the annular groove 122*a*. In this way, the driving-side rotor 122 is rotatable relative to the coil housing 16 without contacting the coil housing 16.

The arm support 24, which is a plate stay made of iron metal, is fixed to the back surface portion 163 of the coil housing 16 with, for example, rivets. A circular hole 24*a*, through which the cylindrical projection (not shown) of the front housing of the compressor is received, is formed in a center portion of the arm support 24.

The arm support 24 is a member that is interposed between the front housing described above and the coil housing 16. The coil housing 16 is fixed to the front housing through the arm support 24.

The driving-side rotor 122 has a friction surface forming portion 122*c* that extends in the radial direction of the driving-side rotor 122. A friction surface 122*b* is formed on the armature 26 side (i.e., the left side in FIG. 1) of the friction surface forming portion 122*c*. A friction material (not shown), which is exposed in the friction surface 122*b*, is formed in the friction surface forming portion 122*c* to improve the transmission of the torque.

The armature 26 is made of iron metal that is the magnetic material. The armature 26 is a plate that extends in the radial direction of the rotational axis CL1 and is shaped into a ring form such that a through-hole 26*a* is formed at a center portion of the armature 26. The armature 26 is placed such that the armature 26 is opposed to the friction surface 122*b* of the driving-side rotor 122 in the direction of the rotational axis CL1. That is, the armature 26 is placed on the opposite side of the friction surface forming portion 122*c*, which is opposite from the coil housing 16 in the direction of the rotational axis CL1.

At a non-energizing time of the electromagnetic coil 20, in which the electromagnetic coil 20 is not energized, the armature 26 is held at a location, which is spaced from the friction surface 122*b* of the driving-side rotor 122 by a predetermined small distance in the direction of the rotational axis CL1, by the elastic force of the elastic member 28 made of rubber described later. Specifically, at a clutch-off time that is the non-energizing time of the electromagnetic coil 20, the armature 26 is placed into a non-contacting state, in which the armature 26 is not in contact with the friction surface 122*b* of the driving-side rotor 122. In contrast, at a clutch-on time that is an energizing time of the electromagnetic coil 20, in which the electromagnetic coil 20 is energized, the armature 26 is attracted to and attached to the friction surface 122*b* of the driving-side rotatable member 12 in the direction of the rotational axis CL1 by the electromagnetic attractive force generated with the electromagnetic coil 20. Furthermore, a magnetic shield groove is formed in the armature 26 such that the magnetic shield groove is shaped into an arcuate form, which extends in a circumferential direction about the rotational axis CL1.

In the electromagnetic clutch 10, a magnetic circuit, which conducts a magnetic flux generated upon the energization of the electromagnetic coil 20, is formed by the driving-side rotor 122, the coil housing 16 and the armature 26.

The elastic member 28 is made of the rubber. Furthermore, the elastic member 28 is arranged such that the elastic member 28 joins between the inner hub 30 and the armature 26 and is rotated integrally with the inner hub 30 and the armature 26. Specifically, the elastic member 28 is molded such that the elastic member 28 is integrally joined to each of the inner hub 30 and the holding member 32 while the holding member 32 is fixed to the armature 26 with, for example, the rivets. The elastic member 28 functions as an elastic connector that holds the armature 26 with the elastic force thereof at a location, which is spaced from the friction surface 122*b* of the driving-side rotor 122, at the non-energizing time of the electromagnetic coil 20.

The material of the elastic member 28 is desirably the rubber, which exhibits excellent performance in terms of the torque transmission and the torque fluctuation damping in an operating environmental temperature range of the automobile, which is in a temperature range of, for example, about −30 degrees Celsius to 115 degrees Celsius. Specifically, the material of the elastic member 28 is desirably, for example, chlorinated butyl rubber, acrylonitrile-butadiene rubber, or ethylene-propylene rubber.

The inner hub 30 is a driven-side rotatable member that is rotated about the rotational axis CL1 upon receiving the rotational force from the driving-side rotatable member 12. The inner hub 30 is made of iron metal. The inner hub 30 has a central cylindrical tubular portion 30*a* at a center of the inner hub 30. A rotatable shaft (not shown) of the compressor is fitted to an inner peripheral part of the central cylindrical tubular portion 30*a* through spline coupling in a manner that limits relative rotation between the rotatable shaft of the compressor and the central cylindrical tubular portion 30a. The inner hub 30 is integrally fixed to the rotatable shaft of the compressor with, for example, a bolt.

The thermal fuse 34 is fused at or higher than a predetermined temperature, which is about 184 degree Celsius, to stop the supply of the electric power to the electromagnetic coil 20. Specifically, the thermal fuse 34 includes a thermosensitive member (e.g., a resin member that is made of an organic compound), which is fused at the predetermined temperature. The thermal fuse 34 maintains an electrically connected state between contacts of the thermal fuse 34 until the thermosensitive member is fused. When the thermosensitive member is fused, the thermal fuse 34 stops the electrically connected state by disconnecting between the contacts by spring action. In order to execute the electrical operation discussed above, a single location of a coil wire of the electromagnetic coil 20 is cut to disconnect the coil wire, and the thermal fuse 34 is joined in series between the disconnected ends of the coil wire. An electrical and mechanical connection between the lead wire 341 (see FIG. 2) of the thermal fuse 34 and the coil wire of the electromagnetic coil 20 can be formed by any appropriate means, such as, soldering, fusing, crimping, or laser welding, In the present embodiment, the laser welding is used as the joining means.

Besides the thermosensitive member, the contact mechanism and the spring, the thermal fuse 34 includes a cylindrical case that receives the thermosensitive member, the contact mechanism and the spring. A profile of the cylindrical case, i.e., a profile of the thermal fuse 34 is a generally cylindrical form. The cylindrical case of the thermal fuse 34 is made of metal.

For example, the thermal fuse 34 stops the electrically connected state discussed above by sensing an abnormal increase of the temperature at a slide contact portion between the armature 26 and the friction surface 122b of the driving-side rotor 122 caused by sliding contact of the friction surface 122b of the driving-side rotor 122 along the armature 26 in a case where the armature 26 is held in a non-rotatable state at the time of locking of the compressor.

Figure 2:
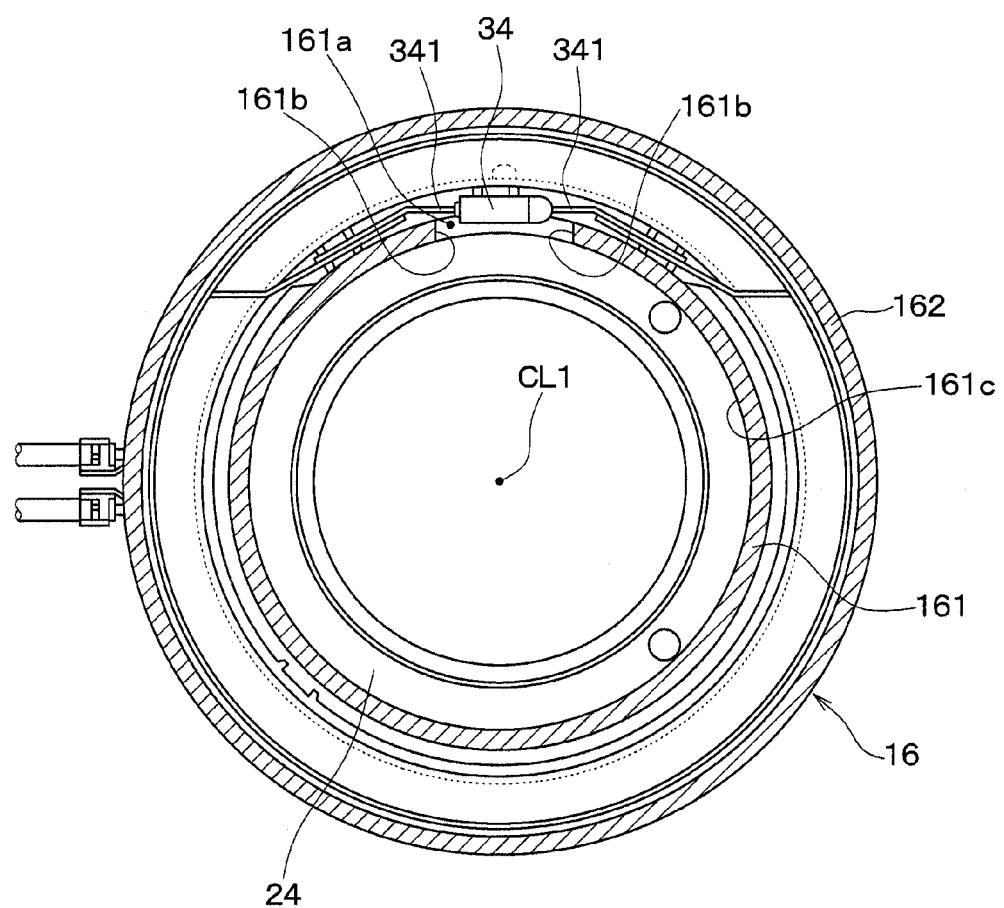
FIG. 2 is a view taken in a direction of an arrow II in FIG. 1 without depicting a driving-side rotatable member, a bearing, an armature, an elastic member, an inner hub and a holding member for the purpose of describing arrangement of a thermal fuse.

Thus, the thermal fuse 34 needs to quickly sense the abnormal increase of the temperature caused by the sliding contact between the armature 26 and the friction surface 122b of the driving-side rotor 122 at the time of locking of the compressor. Furthermore, it is necessary to prevent an erroneous operation of the thermal fuse 34 against the heat generated from the electromagnetic coil 20 at the normal time of the compressor. In view of the above points, the thermal fuse 34 is placed in a manner shown in FIGS. 1 and 2 in the electromagnetic clutch 10 of the present embodiment. FIG. 2 is a view taken in a direction of an arrow II in FIG. 1. In FIG. 2, the driving-side rotatable member 12, the bearing 14, the resin member 22, the armature 26, the elastic member 28, the inner hub 30 and the holding member 32 are not depicted for the purpose of describing the arrangement of the thermal fuse 34. Furthermore, in FIG. 2, the inner ring 161 and the outer ring 162 are indicated by hatching for the purpose of indicating the coil housing 16 in an easily understandable manner.

The arrangement of the thermal fuse 34 will now be described. As shown in FIGS. 1 and 2, the thermal fuse 34 is placed on an inner side of a coil inner peripheral end 201 of the electromagnetic coil 20 (serving as an innermost part of the electromagnetic coil 20) in the radial direction of the rotational axis CL1. Specifically, the cylindrical case, which forms the main body of the thermal fuse 34, is entirely placed on the inner side of the coil inner peripheral end 201.

Furthermore, in the coil housing 16, a cutout 161a is formed in the armature 26 side end part of the inner ring 161. The cutout 161a is formed to open toward the armature 26 side in the direction of the rotational axis CL1. The thermal fuse 34 is placed in the inside of the cutout 161a.

Specifically, the thermal fuse 34 is placed in close proximity to the friction surface 122b of the driving-side rotatable member 12 within such an extent that the thermal fuse 34 does not contact the surface of the annular groove 122a of the driving-side rotor 122. Thereby, the thermal fuse 34 can easily receive the frictional heat generated by the friction between the armature 26 and the friction surface 122b of the driving-side rotatable member 12.

Furthermore, in order to limit contact between the thermal fuse 34 and the driving-side rotor 122, the thermal fuse 34 is placed such that the thermal fuse 34 does not project in the direction of the rotational axis CL1 toward the armature 26 side beyond an outer ring distal end 162a of the outer ring 162 and an inner ring distal end 161f (see FIG. 6) of the inner ring 161, which are located at the armature 26 side. Furthermore, the thermal fuse 34 is also arranged such that the thermal fuse 34 does not project in the radial direction of the rotational axis CL1 toward the inner side beyond an inner ring inner peripheral surface 161c of the inner ring 161, which forms the inner side of the inner ring 161. The thermal fuse 34 is placed adjacent to a surface of the resin member 22, so that a portion of the resin member 22, which covers a surface of the thermal fuse 34, is formed in a form of a thin film.

Furthermore, in order to ensure the electrical insulation of the thermal fuse 34 relative to the coil housing 16, the thermal fuse 34 is spaced from a cutout inner wall surface 161b, which forms the cutout 161a. The resin member 22 is interposed between the cutout inner wall surface 161b and the thermal fuse 34. The cutout 161a of the inner ring 161 extends through the inner ring 161 in the radial direction of the rotational axis CL1, i.e., extends through the inner ring 161 in the vertical direction in FIG. 2. In other words, the cutout 161a is configured to open toward both of the inner side and the outer side in the radial direction.

Next, the operation of the electromagnetic clutch 10 will be described. First of all, the operation of the electromagnetic clutch 10 at the normal operation time of the compressor will be described. The rotation of the crank pulley of the automobile engine is transmitted to the driving-side pulley 121 through the belt, so that the driving-side rotor 122 is always rotated integrally with the driving-side pulley 121.

In the above state, when the electromagnetic coil 20 is energized to operate the vehicle air conditioning apparatus, the magnetic flux flows in the magnetic circuit that extends through the coil housing 16, the driving-side rotor 122 and the armature 26 in this order and returns to the coil housing 16. In this way, the electromagnetic attractive force is generated between the friction surface 122b of the driving-side rotor 122 and the armature 26. Therefore, the armature 26 is attracted to the friction surface 122b of the driving-side rotor 122 against the axial elastic force (the force exerted in the left direction in FIG. 1).

Thus, the driving-side rotor 122 and the armature 26 are integrally rotated, and the rotation is transmitted from the armature 26 to the inner hub 30 through the holding member 32 and the elastic member 28. The rotatable shaft of the compressor is integrally joined to the inner hub 30. Thereby, the rotation of the driving-side pulley 121 is transmitted to the rotatable shaft of the compressor, so that the compressor is driven. At the normal operation time of the compressor, the elastic member 28 made of the rubber functions to damp the torque fluctuation caused by the operation of the compressor.

At the normal operation time of the compressor, the electromagnetic coil 20 is energized and thereby generates the heat. However, in the electromagnetic clutch 10 shown in FIG. 1, the thermal fuse 34 is placed adjacent to the inner ring 161 of the coil housing 16. Therefore, the heat around the thermal fuse 34 is released to the coil housing 16 made of the magnetic metal, which has the better heat conductivity in comparison to the resin. Thus, the temperature around the thermal fuse 34 is kept to the lower temperature, which is substantially lower in comparison to a case where the thermal fuse 34 is placed in a center portion of the resin member 22, which has the low heat conductivity.

Thus, even when the electromagnetic coil 20 generates the heat, it is possible to substantially reduce the possibility of that the thermal fuse 34 is placed into an open state by the malfunction of the thermal fuse 34 caused by the heat generated from the electromagnetic coil 20. In contrast, when the compressor has a critical failure, such as galling, and is thereby locked, the armature 26, which is joined to the rotatable shaft of the compressor, cannot be rotated. Therefore, the driving-side rotor 122 is rotated while the driving-side rotor 122 slides over the armature 26. As a result, the temperature of the slide contact portion between the armature 26 and the driving-side rotor 122 is abnormally increased by the frictional heat.

Since the coil housing 16 has the higher heat conductivity in comparison to that of the resin, the temperature of the adjacent portion of the coil housing 16, which is adjacent to the friction surface 122b of the driving-side rotor 122, i.e., the temperature of the armature 26 side distal end portion of the inner ring 161 is rapidly increased upon receiving the heat caused by the temperature increase of the driving-side rotor 122. Therefore, the thermal fuse 34 receives the heat through the distal end portion of the inner ring 161 in addition to the amount of heat received through the thin film portion of the resin member 22 placed on the surface of the thermal fuse 34. Thus, the thermal fuse 34 will have a quick temperature increase in response to the temperature increase of the driving-side rotor 122.

In this way, the temperature of the thermal fuse 34 increases to an opening temperature of the thermal fuse 34, i.e., a fusing temperature of the thermal fuse 34 within a short period of time to stop the supply of the electric power to the electromagnetic coil 20 after the occurrence of the locking of the compressor. When the thermal fuse 34 stops the supply of the electric power to the electromagnetic coil 20 in this way, the armature 26 is moved away from the friction surface 122b of the driving-side rotor 122 in the direction of the rotational axis CL1 by the elastic force of the elastic member 28. That is, the electromagnetic clutch 10 is placed in the clutch-off state, in which the transmission of the drive force between the driving-side rotatable member 12 and the inner hub 30 is stopped.

As discussed above, according to the present embodiment, the coil housing 16 includes the inner ring 161, which is shaped into the annular form and is located on the inner side of the electromagnetic coil 20 in the radial direction of the rotational axis CL1. Since the thermal fuse 34 is placed on the inner side of the coil inner peripheral end 201 of the electromagnetic coil 20 in the radial direction, the thermal fuse 34 can be placed in such a manner that the thermal fuse 34 does not limit the length of the electromagnetic coil 20 in the direction of the rotational axis CL1 by using the radial thickness of the inner ring 161 that is indispensable as a part of the structure of the magnetic circuit. Thus, in comparison to the electromagnetic clutch of the patent literature 1, in which the profile of the electromagnetic coil is limited by the thermal fuse at the inner peripheral corner of the electromagnetic coil, it is possible to sufficiently limit the occurrence of the limiting of the size of the electromagnetic coil 20 that is caused by the placement of the thermal fuse 34.

Furthermore, according to the present embodiment, the cutout 161a is formed in the inner ring 161 of the coil housing 16 such that the cutout 161a is opened on the armature 26 side in the direction of the rotational axis CL1, and the thermal fuse 34 is placed in the inside of the cutout 161a. The cutout 161a extends through the inner ring 161 in the radial direction of the rotational axis CL1. Thus, it is easy to ensure the large installation space, in which the thermal fuse 34 is installed. Furthermore, at the time of forming the cutout 161a in the coil housing 16 through a presswork process, the cutout 161a can be formed by cutting a corresponding portion of the inner ring 161 in the radial direction of the inner ring 161. Thus, a size of an excess wall portion of the inner ring 161 can be reduced at the time of forming the cutout 161a in comparison to a case where a corresponding portion of the inner ring 161 is pressed in the axial direction of the inner ring 161 in a presswork process. Thus, it is possible to limit occurrence of reduction of a size of the annular groove 16a, which serves as the coil receiving portion, by the excess wall portion formed in the presswork process.

Furthermore, according to the present embodiment, the resin member 22 is interposed between the cutout inner wall surface 161b of the coil housing 16 and the thermal fuse 34, so that the electrical insulation between the thermal fuse 34 and the coil housing 16 can be reliably ensured.

Furthermore, according to the present embodiment, the thermal fuse 34 is located at the inner peripheral side of the coil housing 16 and is placed adjacent to the friction surface forming portion 122c of the driving-side rotor 122. Thus, the frictional heat of the friction surface forming portion 122c can be easily transmitted to the thermal fuse 34, and thereby the good operational response of the thermal fuse 34 can be obtained.

Second Embodiment

Next, a second embodiment of the present disclosure will be described. In the present embodiment, differences, which are different from the first embodiment, will be mainly described, and discussion of the portions, which are the same as or equivalent to those of the first embodiment, will be omitted or simplified. This is also true for the other embodiments discussed later.

Figure 3:
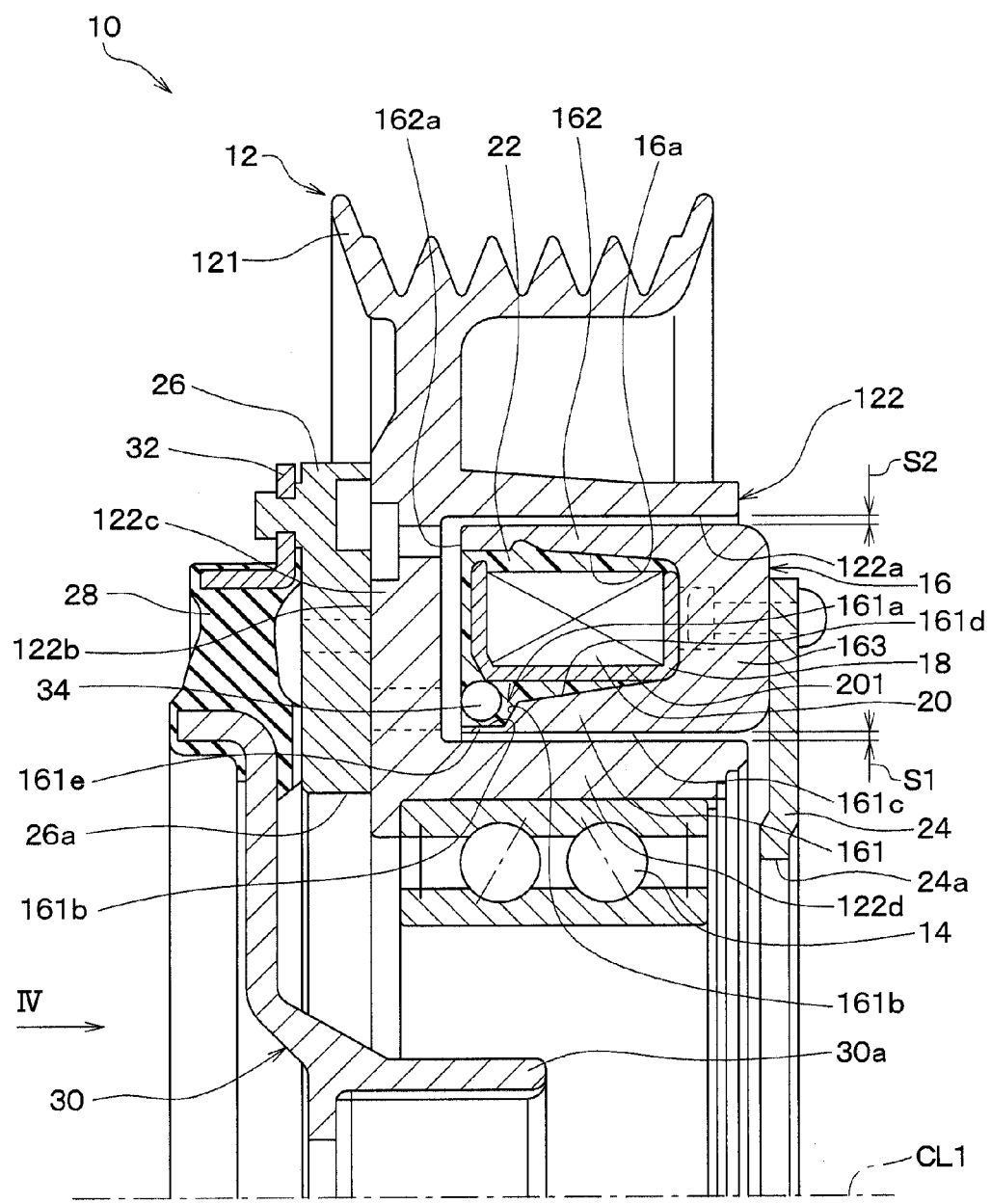
FIG. 3 is a longitudinal cross sectional view, which corresponds to FIG. 1 and shows an electromagnetic clutch according to a second embodiment of the present disclosure.
Figure 4:
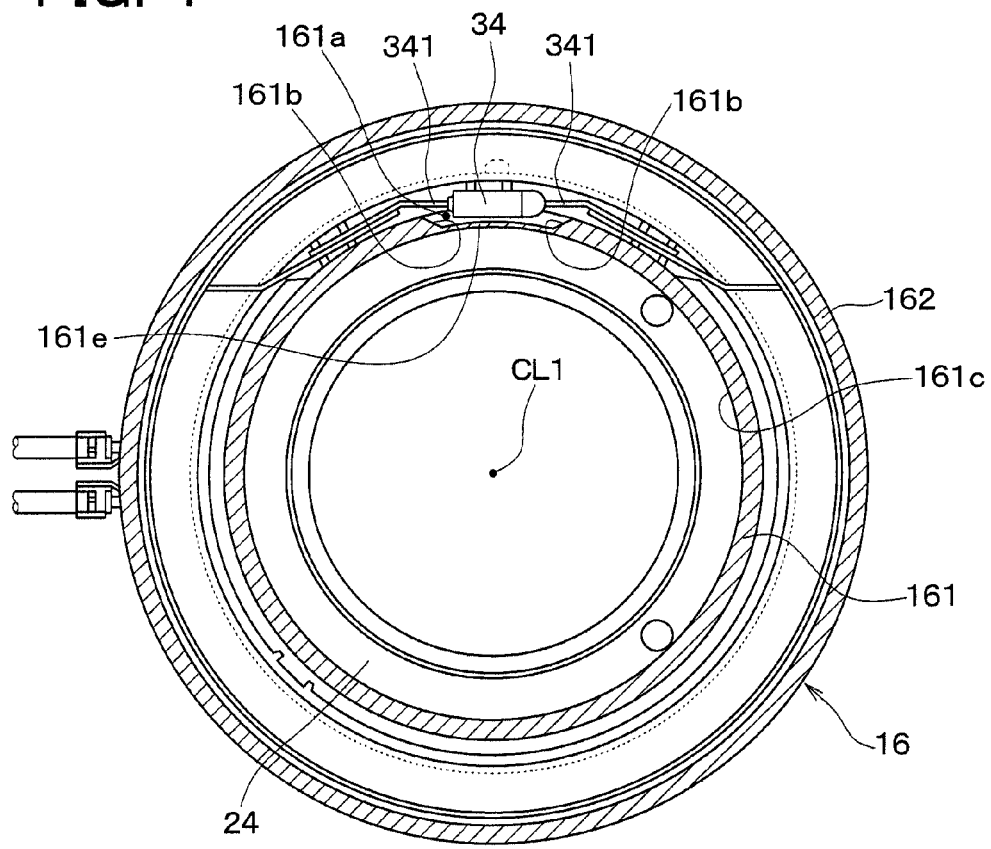
FIG. 4 is a view, which corresponds to FIG. 2 and is taken in a direction of an arrow IV in FIG. 3.

FIG. 3 is a longitudinal cross sectional view that corresponds to FIG. 1 and shows the electromagnetic clutch 10 according to the present embodiment. FIG. 4 is a view that corresponds to FIG. 2 and is taken in a direction of an arrow IV in FIG. 3. Even in FIG. 4, like FIG. 2, the components, such as the driving-side rotatable member 12, are not depicted.

In the present embodiment, the cutout 161a, which is formed in the inner ring 161 of the coil housing 16, differs from that of the first embodiment. As shown in FIGS. 3 and 4, the cutout 161a does not extend through the inner ring 161 in the radial direction of the rotational axis CL1. Specifically, the inner ring 161 includes a closing portion 161e that has a thin wall thickness. The cutout 161a of the inner ring 161 opens toward the armature 26 side in the direction of the rotational axis CL1 and also opens toward the outer side in the radial direction of the rotational axis CL1. However, the cutout 161a is closed with the closing portion 161e at the inner side in the radial direction of the rotational axis CL1.

The thermal fuse 34 is placed in the cutout 161a at a location, which is on the outer side of the closing portion 161e in the radial direction of the rotational axis CL1. The thermal fuse 34 is spaced from the cutout inner wall surface 161b like in the first embodiment in order to ensure the electrical insulation relative to the coil housing 16. Thus, the thermal fuse 34 is also spaced from the closing portion 161e. The resin member 22 is also interposed between the thermal fuse 34 and the closing portion 161e.

According to the present embodiment, similar to the first embodiment, it is possible to place the thermal fuse 34 in such a manner that the thermal fuse 34 does not limit the length of the electromagnetic coil 20 in the direction of the rotational axis CL1. Furthermore, according to the present embodiment, the inner ring 161 of the coil housing 16 includes the closing portion 161e, which closes the cutout 161a at the radially inner side of the cutout 161a. Thus, at the time of molding the resin member 22 integrally with the coil housing 16, the closing portion 161e can limit leakage of the molten resin member 22 from the cutout 161a toward the radially inner side of the inner ring 161.

Other Embodiments (1) In the above embodiments, the thermal fuse 34 is placed such that the thermal fuse 34 does not project toward the inner side from the inner ring inner peripheral surface 161c in the radial direction of the rotational axis CL1. This arrangement is for the purpose of forming the gap S1 (see FIG. 1) between the outer peripheral surface of the bearing fitting portion 122d and the inner ring inner peripheral surface 161c of the coil housing 16.

Figure 5:
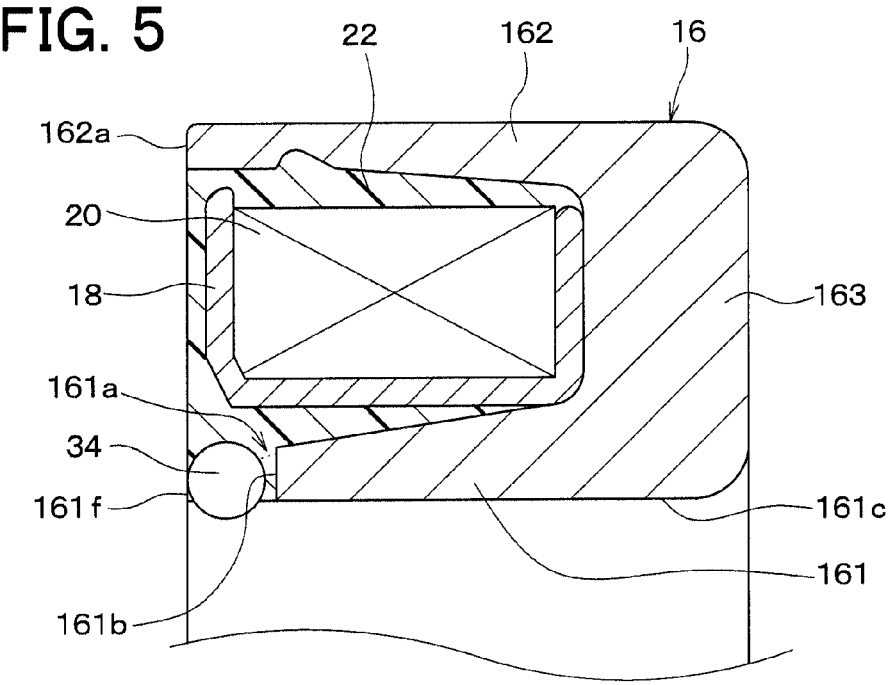
FIG. 5 is a cross sectional view, which is taken along the same cross section as that of FIG. 1 and shows a first modification of the first embodiment, depicting a coil housing, a coil spool, an electromagnetic coil, a resin member and a thermal fuse of the first modification of the first embodiment.

Thus, as long as the provision of the radial gap S1 is ensured, the thermal fuse 34 may project from the inner ring inner peripheral surface 161c of the coil housing 16 toward the inner side in the radial direction of the rotational axis CL1, as shown in FIG. 5. FIG. 5 is a cross sectional view, which is taken along the same cross section as that of FIG. 1 and shows the first modification of the first embodiment, depicting the coil housing 16, the coil spool 18, the electromagnetic coil 20, the resin member 22 and the thermal fuse 34 of the first modification.

(2) In the first embodiment, the thermal fuse 34 is placed such that the thermal fuse 34 does not project from the coil housing 16 toward the friction surface forming portion 122c in the direction of the rotational axis CL1. This arrangement is for the purpose of forming a gap G (see FIG. 1) in the direction of the rotational axis CL1 between a wall surface of the friction surface forming portion 122c, which is opposite from the friction surface 122b in the axial direction, and the thermal fuse 34 as well as the coil housing 16.

Figure 6:
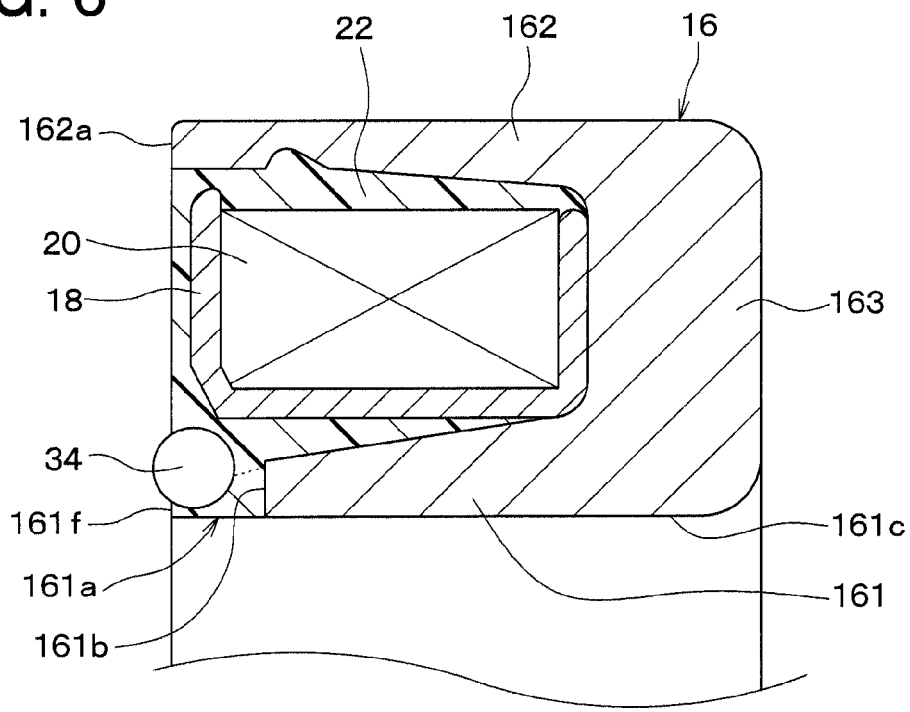
FIG. 6 is a cross sectional view, which is taken along the same cross section as that of FIG. 1 and shows a second modification of the first embodiment, showing a coil housing, a coil spool, an electromagnetic coil, a resin member and a thermal fuse of the second modification of the first embodiment.

Thus, as long as the provision of the gap G in the direction of the rotational axis CL1 is ensured, the thermal fuse 34 may project from the coil housing 16 in the direction of the rotational axis CL1 toward the friction surface forming portion 122c (see FIG. 1), as shown in FIG. 6. This is also true for the second embodiment. When the thermal fuse 34 is placed in a manner shown in FIG. 6, the transmission of the heat from the friction surface forming portion 122c to the thermal fuse 34 is promoted. Thus, the good operational response of the thermal fuse 34 can be obtained. FIG. 6 is a cross sectional view, which is taken along the same cross section as that of FIG. 1 and shows the second modification of the first embodiment, depicting the coil housing 16, the coil spool 18, the electromagnetic coil 20, the resin member 22 and the thermal fuse 34 of the second modification.

(3) In the second embodiment, a cutout forming method for forming the cutout 161a in the housing 16 is not mentioned. However, the cutout forming method is not limited to any particular method and may be a cutting process or a presswork process. For example, in the case where the cutout 161a is formed by the presswork process, a corresponding portion of the inner ring 161 of the coil housing 16 is pressed in the axial direction, i.e., the lateral direction from the left side to the right side in FIG. 7, so that the corresponding portion of the inner ring 161, in which the cutout 161a is formed, is plastically deformed.

Figure 7:
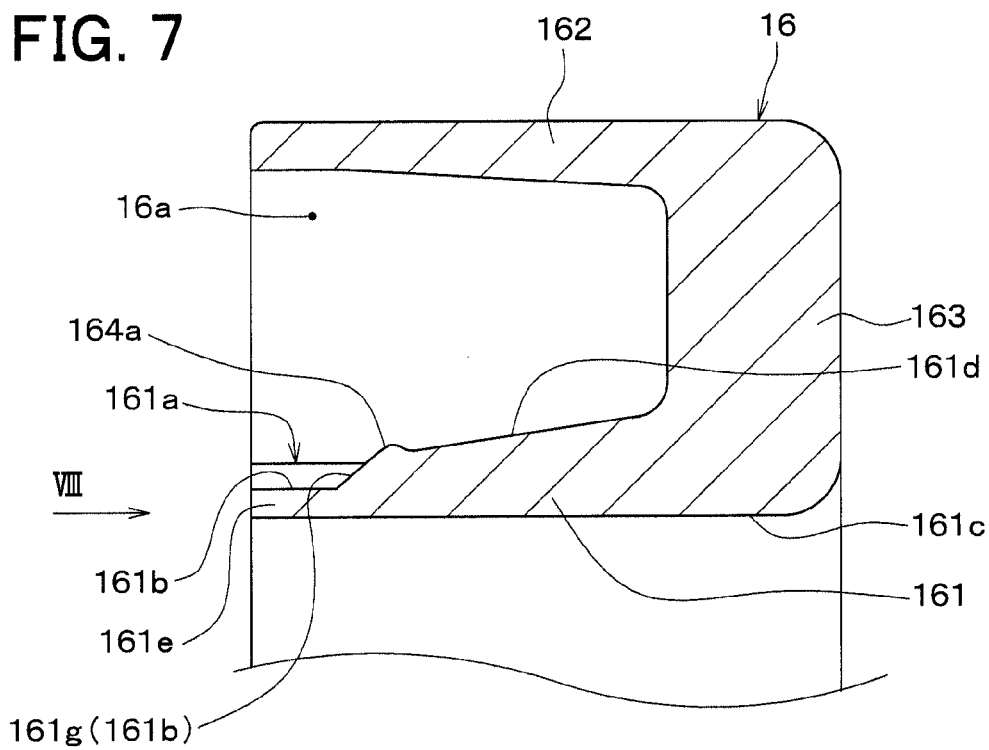
FIG. 7 is a cross sectional view, which is taken along the same cross section as that of FIG. 1 and shows a modification of the second embodiment, depicting a coil housing of the modification of the second embodiment.
Figure 8:
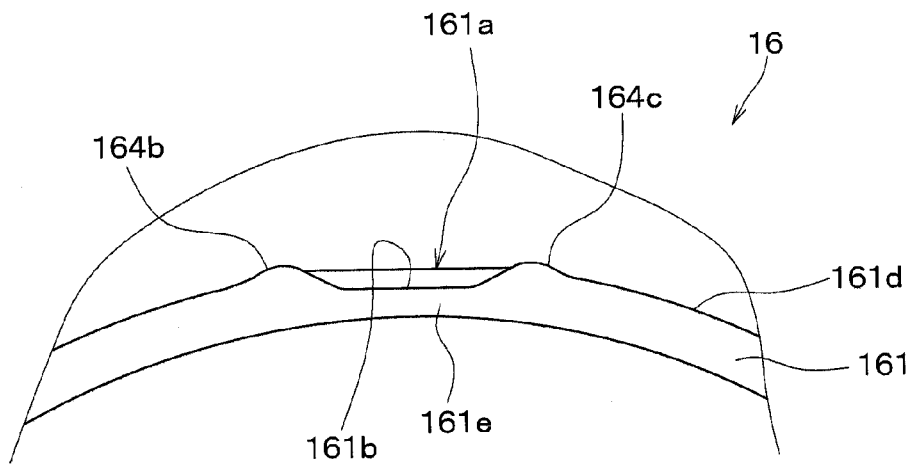
FIG. 8 is a view taken in a direction of an arrow VIII in FIG. 7.

Here, excess wall portions may be formed in the process of forming of the cutout 161a at the time of executing the presswork process such that the excess wall portions respectively form outer peripheral protrusions 164a, 164b, 164c, which are bulged from the inner ring outer peripheral surface 161d of the inner ring 161, as shown in FIGS. 7 and 8. The excess wall portions refer to the bulges of the material of the coil housing 16 formed around the cutout 161a through the plastic deformation of the material at the time of forming the cutout 161a through the presswork process.

The outer peripheral protrusion 164a shown in FIG. 7 is formed in a portion of the inner ring 161, which forms a bottom portion 161g of the cutout 161a in the direction of the rotational axis CL1. Furthermore, the outer peripheral protrusions 164b, 164c shown in FIG. 8 are formed in portions of the inner ring 161, which are adjacent to the cutout 161a in the circumferential direction of the inner ring 161.

In the case where at least one of the outer peripheral protrusions 164a, 164b, 164c shown in FIGS. 7 and 8 is formed, the resin member 22, which is molded in the annular groove 16a of the coil housing 16, is anchored to the at least one of the outer peripheral protrusions 164a, 164b, 164c. Therefore, it is possible to limit disengagement of the resin member 22 from the annular groove 16a. Thereby, for example, it is not required to form, for example, a recess(es) in a portion of the wall surface of the annular groove 16a through, for example, a cutting process to ensure engagement of the resin member 22 in the annular groove 16a.

FIG. 7 is a cross sectional view, which is taken along the same cross section as that of FIG. 1 and shows the modification of the second embodiment, depicting the coil housing 16. FIG. 8 is a view taken in a direction of an arrow VIII in FIG. 7. In FIGS. 7 and 8, the three outer peripheral protrusions 164a, 164b, 164c are depicted. Alternatively, only the outer peripheral protrusion 164a shown in FIG. 7 among the outer peripheral protrusions 164a, 164b, 164c may be provided. Further alternatively, only one or both of the two outer peripheral protrusions 164b, 164c shown in FIG. 8 may be provided.

(4) In the first embodiment, the single cutout 161a is formed in the inner ring 161 of the coil housing 16. Additionally, besides the cutout 161a, which receives the thermal fuse 34, a second cutout (see FIG. 9) may be formed to press the coil housing 16 in good balance at the time of forming the cutout 161a through the presswork process.

Figure 9:
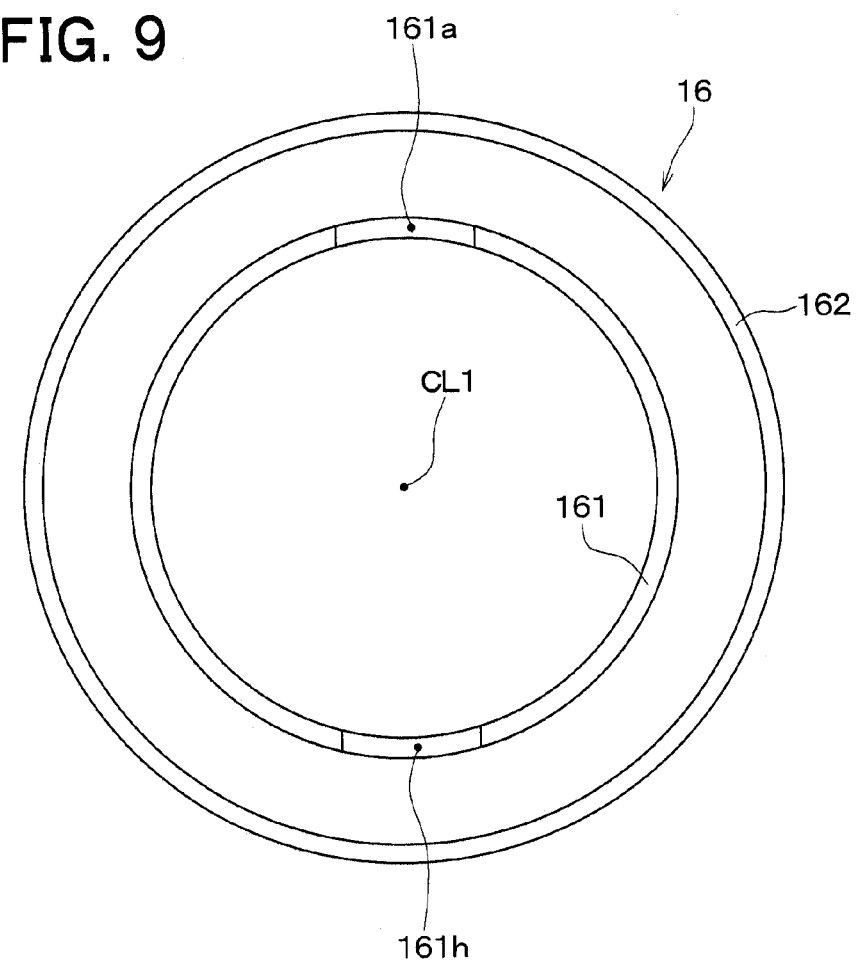
FIG. 9 is a view of a coil housing alone taken in a direction, which is the same as the direction of the arrow II in FIG. 1, depicting a third modification of the first embodiment.

The second cutout 161h may be formed in a manner shown in FIG. 9. Specifically, the cutout 161a is formed as a first cutout 161a in the inner ring 161 in FIG. 9. Furthermore, the second cutout 161h is formed in the inner ring 161 such that the second cutout 161h opens in the direction of the rotational axis CL1 toward the armature 26, i.e., the second cutout 161h is formed to have the same shape as that of the first cutout 161a. In the view taken in the direction of the rotational axis CL1, the second cutout 161h is placed on the opposite side of the rotational axis CL1 (i.e., the center of the inner ring 161), which is opposite from the first cutout 161a. In a cutout forming step of forming the first cutout 161a and the second cutout 161h, the first cutout 161a and the second cutout 161h are simultaneously formed in the presswork process. The high processing accuracy of the coil housing 16 can be easily ensured in the presswork process by providing the second cutout 161h.

FIG. 9 is a view of the coil housing 16 alone taken in the direction, which is the same as the direction of the arrow II in FIG. 1, depicting the third modification of the first embodiment. The second cutout 161h is provided to meet the need in the process of forming the coil housing 16 and is not provided to receive the thermal fuse 34. Furthermore, although FIG. 9 indicates the coil housing 16 of the first embodiment, the second cutout 161h may be formed in the coil housing 16 of the second embodiment in a manner similar to that of FIG. 9. In such a case, it is desirable to have the closing portion 161e in the portion of the coil housing 16 where the second cutout 161h is formed, so that the two cutouts 161a, 161h have the identical shape.

(5) In each of the above embodiments, the cylindrical case of the thermal fuse 34 is made of the metal. However, the cylindrical case should not be limited to the cylindrical case made of the metal. For example, a cylindrical case made of another type of material, such as ceramic, may be used in place of the cylindrical case made of the metal.

The present disclosure is not limited to the above embodiments, and the above embodiments may be appropriately modified within the scope of the present disclosure. Furthermore, in the above respective embodiments, it should be understood that the components are not necessarily indispensable except a case where the components are expressly stated as indispensable and a case where the components are regarded as indispensable in view of the principle of the present disclosure. Furthermore, in each of the above embodiments, in the case where the number of the component(s), the value, the amount, the range, and/or the like is specified, the present disclosure is not limited to the number of the component(s), the value, the amount, and/or the like specified in the embodiment unless the number of the component(s), the value, the amount, and/or the like is indicated as indispensable or is obviously indispensable in view of the principle of the present disclosure. Furthermore, in each of the above embodiments, in the case where the material of the component(s), the shape of the component(s), and/or the positional relationship of the component(s) are specified, the present disclosure is not limited to the material of the component(s), the shape of the component(s), and/or the positional relationship of the component(s) unless the embodiment specifically states that the material of the component(s), the shape of the component(s), and/or the positional relationship of the component(s) is necessary, or the embodiment states that the present disclosure is limited in principle to the material of the component(s), the shape of the component(s), and/or the positional relationship of the component(s) discussed above.

What is claimed is:

1. An electromagnetic clutch comprising:
    a driving-side rotatable member that is made of a magnetic material and is rotated about a rotational axis upon receiving a rotational force from a rotational drive source;
    a driven-side rotatable member that is rotated about the rotational axis upon receiving the rotational force from the driving-side rotatable member;
    an electromagnetic coil that is shaped into an annular form, which is centered on the rotational axis, wherein the electromagnetic coil generates an electromagnetic attractive force upon energization of the electromagnetic coil;
    a coil housing that is fixed to a non-rotatable member and is made of a magnetic material, wherein the electromagnetic coil is received in and is fixed to the coil housing;
    an armature that is made of a magnetic material, wherein the armature is attracted to and attached to a friction surface of the driving-side rotatable member in an axial direction of the rotational axis by the electromagnetic attractive force generated from the electromagnetic coil;
    an elastic connector that joins between the driven-side rotatable member and the armature and is placed to rotate integrally with the driven-side rotatable member and the armature, wherein the elastic connector holds the armature at a location, which is spaced from the friction surface of the driving-side rotatable member, when the electromagnetic coil is not energized; and
    a thermal fuse that is fixed to the coil housing and is placed to receive frictional heat, which is generated by friction between the armature and the friction surface of the driving-side rotatable member, wherein the thermal fuse is melted and is opened to cut supply of an electric power to the electromagnetic coil when a temperature is equal to or higher than a predetermined temperature, and wherein the thermal fuse is placed entirely on an inner side of an innermost part of the electromagnetic coil in a radial direction of the rotational axis.

2. The electromagnetic clutch according to claim 1, wherein the coil housing has an inner ring, which is shaped into an annular form and is placed on an inner side of the electromagnetic coil in the radial direction of the rotational axis.

3. The electromagnetic clutch according to claim 2, wherein:
    the inner ring has a cutout, which opens on an armature side in the axial direction;
    the thermal fuse is placed in the cutout in the radial direction;
    the cutout extends through the inner ring in the radial direction;
    the inner ring includes a cutout inner wall surface, which forms the cutout; and
    the cutout is placed between two circumferentially opposed surface sections of the cutout inner wall surface in a circumferential direction of the inner ring, while the two circumferentially opposed surface sections of the cutout inner wall surface radially inwardly extend from an outer peripheral surface of the inner ring and are opposed to each other in the circumferential direction.

4. The electromagnetic clutch according to claim 3, wherein:
    the driving-side rotatable member has an inner peripheral portion, which is located on an inner side of the thermal fuse and the inner ring in the radial direction;
    the inner peripheral portion forms a gap relative to the thermal fuse and the inner ring in the radial direction; and
    the thermal fuse is placed to project inwardly from the inner ring in the radial direction.

5. The electromagnetic clutch according to claim 2, wherein:

a cutout, which opens toward an armature side in the axial direction, is formed in the inner ring, and the inner ring has a closing portion, which closes the cutout on an inner side of the cutout in the radial direction;

the thermal fuse is placed in the cutout on an outer side of the closing portion in the radial direction;

the inner ring includes a cutout inner wall surface, which forms the cutout; and the cutout is placed between two circumferentially opposed surface sections of the cutout inner wall surface in a circumferential direction of the inner ring, while the two circumferentially opposed surface sections of the cutout inner wall surface radially inwardly extend from an outer peripheral surface of the inner ring and are opposed to each other in the circumferential direction.

6. The electromagnetic clutch according to claim 3, comprising a dielectric member, which is made of a dielectric material and is fixed to the coil housing, wherein:

the thermal fuse is placed away from the cutout inner wall surface; and the dielectric member is formed such that the dielectric member is interposed between the cutout inner wall surface and the thermal fuse.

7. The electromagnetic clutch according to claim 6, wherein the dielectric member is resin that is filled in a coil receiving portion of the coil housing, which receives the electromagnetic coil.

8. The electromagnetic clutch according to claim 3, wherein:

an inner ring outer peripheral surface is formed at an outer side of the inner ring, which is located on an outer side in the radial direction;

the inner ring has an outer peripheral protrusion that is formed by an excess material of the inner ring, which is produced through press forming of the cutout in a presswork process of the coil housing, and the outer peripheral protrusion protrudes from the inner ring outer peripheral surface; and the outer peripheral protrusion is placed in a portion of the inner ring, which forms a bottom portion of the cutout in the axial direction.

9. The electromagnetic clutch according to claim 3, wherein:

an inner ring outer peripheral surface is formed in an outer side of the inner ring, which is located on an outer side in the radial direction;

the inner ring has an outer peripheral protrusion that is formed by an excess material of the inner ring, which is produced through press forming of the cutout in a presswork process of the coil housing, and the outer peripheral protrusion protrudes from the inner ring outer peripheral surface; and the outer peripheral protrusion is placed in a portion of the inner ring, which is placed adjacent to the cutout in a circumferential direction of the inner ring.

10. The electromagnetic clutch according to claim 3, wherein:

the cutout is formed as a first cutout in the inner ring;

a second cutout is also formed in the inner ring such that the second cutout opens toward the armature side in the axial direction; and in a view taken in the axial direction, the second cutout is located on an opposite side of a center of the inner ring, which is opposite from the first cutout.

11. The electromagnetic clutch according to claim 1, wherein:

the driving-side rotatable member has a friction surface forming portion, which has the friction surface;

the friction surface forming portion forms a gap in the axial direction relative to the thermal fuse and the coil housing on an opposite side of the friction surface forming portion, which is opposite from the friction surface in the axial direction; and the thermal fuse projects from the coil housing toward the friction surface forming portion in the axial direction.

12. A method for manufacturing the electromagnetic clutch of claim 10, comprising:

a cutout forming step of simultaneously forming the first cutout and the second cutout in a presswork process.

13. The electromagnetic clutch according to claim 5, wherein:

the cutout is formed as a first cutout in the inner ring;

a second cutout is also formed in the inner ring such that the second cutout opens toward the armature side in the axial direction; and in a view taken in the axial direction, the second cutout is located on an opposite side of a center of the inner ring, which is opposite from the first cutout.

14. A method for manufacturing the electromagnetic clutch of claim 13, comprising:

a cutout forming step of simultaneously forming the first cutout and the second cutout in a presswork process.

15. An electromagnetic clutch comprising:

a driving-side rotatable member that is made of a magnetic material and is rotated about a rotational axis upon receiving a rotational force from a rotational drive source;

a driven-side rotatable member that is rotated about the rotational axis upon receiving the rotational force from the driving-side rotatable member;

an electromagnetic coil that is shaped into an annular form, which is centered on the rotational axis, wherein the electromagnetic coil generates an electromagnetic attractive force upon energization of the electromagnetic coil;

a coil housing that is fixed to a non-rotatable member and is made of a magnetic material, wherein the electromagnetic coil is received in and is fixed to the coil housing;

an armature that is made of a magnetic material, wherein the armature is attracted to and attached to a friction surface of the driving-side rotatable member in an axial direction of the rotational axis by the electromagnetic attractive force generated from the electromagnetic coil;

an elastic connector that joins between the driven-side rotatable member and the armature and is placed to rotate integrally with the driven-side rotatable member and the armature, wherein the elastic connector holds the armature at a location, which is spaced from the friction surface of the driving-side rotatable member, when the electromagnetic coil is not energized; and a thermal fuse that is fixed to the coil housing and is placed to receive frictional heat, which is generated by friction between the armature and the friction surface of the driving-side rotatable member, wherein the thermal fuse is melted and is opened to cut supply of an electric power to the electromagnetic coil when a temperature is equal to or higher than a predetermined temperature, and wherein the thermal fuse is placed on an inner side of an innermost part of the electromagnetic coil in a radial direction of the rotational axis, wherein the coil housing has an inner ring, which is shaped into an annular form and is placed on an inner side of the electromagnetic coil in the radial direction of the rotational axis, the inner ring has a cutout, which opens on an armature side in the axial direction, the thermal fuse is placed in the cutout in the radial direction, the cutout extends through the inner ring in the radial direction, the inner ring includes a cutout inner wall surface, which forms the cutout, and the cutout is placed between two circumferentially opposed surface sections of the cutout inner wall surface in a circumferential direction of the inner ring, while the two circumferentially opposed surface sections of the cutout inner wall surface radially inwardly extend from an outer peripheral surface of the inner ring and are opposed to each other in the circumferential direction.

16. The electromagnetic clutch according to claim 15, wherein:

the driving-side rotatable member has an inner peripheral portion, which is located on an inner side of the thermal fuse and the inner ring in the radial direction;

the inner peripheral portion forms a gap relative to the thermal fuse and the inner ring in the radial direction; and the thermal fuse is placed to project inwardly from the inner ring in the radial direction.

17. The electromagnetic clutch according to claim 15, comprising a dielectric member, which is made of a dielectric material and is fixed to the coil housing, wherein:

the thermal fuse is placed away from the cutout inner wall surface; and the dielectric member is formed such that the dielectric member is interposed between the cutout inner wall surface and the thermal fuse.

18. The electromagnetic clutch according to claim 17, wherein the dielectric member is resin that is filled in a coil receiving portion of the coil housing, which receives the electromagnetic coil.

19. The electromagnetic clutch according to claim 15, wherein:

an inner ring outer peripheral surface is formed at an outer side of the inner ring, which is located on an outer side in the radial direction;

the inner ring has an outer peripheral protrusion that is formed by an excess material of the inner ring, which is produced through press forming of the cutout in a presswork process of the coil housing, and the outer peripheral protrusion protrudes from the inner ring outer peripheral surface; and the outer peripheral protrusion is placed in a portion of the inner ring, which forms a bottom portion of the cutout in the axial direction.

20. The electromagnetic clutch according to claim 15, wherein:

an inner ring outer peripheral surface is formed in an outer side of the inner ring, which is located on an outer side in the radial direction;

the inner ring has an outer peripheral protrusion that is formed by an excess material of the inner ring, which is produced through press forming of the cutout in a presswork process of the coil housing, and the outer peripheral protrusion protrudes from the inner ring outer peripheral surface; and the outer peripheral protrusion is placed in a portion of the inner ring, which is placed adjacent to the cutout in a circumferential direction of the inner ring.

21. The electromagnetic clutch according to claim 15, wherein:

the cutout is formed as a first cutout in the inner ring;

a second cutout is also formed in the inner ring such that the second cutout opens toward the armature side in the axial direction; and in a view taken in the axial direction, the second cutout is located on an opposite side of a center of the inner ring, which is opposite from the first cutout.

22. The electromagnetic clutch according to claim 15, wherein:

the driving-side rotatable member has a friction surface forming portion, which has the friction surface;

the friction surface forming portion forms a gap in the axial direction relative to the thermal fuse and the coil housing on an opposite side of the friction surface forming portion, which is opposite from the friction surface in the axial direction; and the thermal fuse projects from the coil housing toward the friction surface forming portion in the axial direction.

23. A method for manufacturing the electromagnetic clutch of claim 21, comprising:

a cutout forming step of simultaneously forming the first cutout and the second cutout in a presswork process.

24. An electromagnetic clutch comprising:

a driving-side rotatable member that is made of a magnetic material and is rotated about a rotational axis upon receiving a rotational force from a rotational drive source;

a driven-side rotatable member that is rotated about the rotational axis upon receiving the rotational force from the driving-side rotatable member;

an electromagnetic coil that is shaped into an annular form, which is centered on the rotational axis, wherein the electromagnetic coil generates an electromagnetic attractive force upon energization of the electromagnetic coil;

a coil housing that is fixed to a non-rotatable member and is made of a magnetic material, wherein the electromagnetic coil is received in and is fixed to the coil housing;

an armature that is made of a magnetic material, wherein the armature is attracted to and attached to a friction surface of the driving-side rotatable member in an axial direction of the rotational axis by the electromagnetic attractive force generated from the electromagnetic coil;

an elastic connector that joins between the driven-side rotatable member and the armature and is placed to rotate integrally with the driven-side rotatable member and the armature, wherein the elastic connector holds the armature at a location, which is spaced from the friction surface of the driving-side rotatable member, when the electromagnetic coil is not energized; and a thermal fuse that is fixed to the coil housing and is placed to receive frictional heat, which is generated by friction between the armature and the friction surface of the driving-side rotatable member, wherein the thermal fuse is melted and is opened to cut supply of an electric power to the electromagnetic coil when a temperature is equal to or higher than a predetermined temperature, and wherein the thermal fuse is placed on an inner side of an innermost part of the electromagnetic coil in a radial direction of the rotational axis, wherein the coil housing has an inner ring, which is shaped into an annular form and is placed on an inner side of the electromagnetic coil in the radial direction of the rotational axis, a cutout, which opens toward an armature side in the axial direction, is formed in the inner ring, and the inner ring has a closing portion, which closes the cutout on an inner side of the cutout in the radial direction, the thermal fuse is placed in the cutout on an outer side of the closing portion in the radial direction, the inner ring includes a cutout inner wall surface, which forms the cutout, and the cutout is placed between two circumferentially opposed surface sections of the cutout inner wall surface in a circumferential direction of the inner ring, while the two circumferentially opposed surface sections of the cutout inner wall surface radially inwardly extend from an outer peripheral surface of the inner ring and are opposed to each other in the circumferential direction.

25. The electromagnetic clutch according to claim 24, comprising a dielectric member, which is made of a dielectric material and is fixed to the coil housing, wherein:

the thermal fuse is placed away from the cutout inner wall surface; and the dielectric member is formed such that the dielectric member is interposed between the cutout inner wall surface and the thermal fuse.

26. The electromagnetic clutch according to claim 25, wherein the dielectric member is resin that is filled in a coil receiving portion of the coil housing, which receives the electromagnetic coil.

27. The electromagnetic clutch according to claim 24, wherein:

an inner ring outer peripheral surface is formed at an outer side of the inner ring, which is located on an outer side in the radial direction;

the inner ring has an outer peripheral protrusion that is formed by an excess material of the inner ring, which is produced through press forming of the cutout in a presswork process of the coil housing, and the outer peripheral protrusion protrudes from the inner ring outer peripheral surface; and the outer peripheral protrusion is placed in a portion of the inner ring, which forms a bottom portion of the cutout in the axial direction.

28. The electromagnetic clutch according to claim 24, wherein:

an inner ring outer peripheral surface is formed in an outer side of the inner ring, which is located on an outer side in the radial direction;

the inner ring has an outer peripheral protrusion that is formed by an excess material of the inner ring, which is produced through press forming of the cutout in a presswork process of the coil housing, and the outer peripheral protrusion protrudes from the inner ring outer peripheral surface; and the outer peripheral protrusion is placed in a portion of the inner ring, which is placed adjacent to the cutout in a circumferential direction of the inner ring.

29. The electromagnetic clutch according to claim 24, wherein:

the cutout is formed as a first cutout in the inner ring;

a second cutout is also formed in the inner ring such that the second cutout opens toward the armature side in the axial direction; and in a view taken in the axial direction, the second cutout is located on an opposite side of a center of the inner ring, which is opposite from the first cutout.

30. The electromagnetic clutch according to claim 24, wherein:

the driving-side rotatable member has a friction surface forming portion, which has the friction surface;

the friction surface forming portion forms a gap in the axial direction relative to the thermal fuse and the coil housing on an opposite side of the friction surface forming portion, which is opposite from the friction surface in the axial direction; and the thermal fuse projects from the coil housing toward the friction surface forming portion in the axial direction.

31. A method for manufacturing the electromagnetic clutch of claim 29, comprising:

a cutout forming step of simultaneously forming the first cutout and the second cutout in a presswork process.

\* \* \* \* \*